(12) United States Patent
Ataman

(10) Patent No.: US 12,352,361 B2
(45) Date of Patent: Jul. 8, 2025

(54) FUSE PIN VALVE

(71) Applicant: SAFRAN LANDING SYSTEMS CANADA INC., Ajax ON (CA)

(72) Inventor: Gary Stephen Ataman, Ajax (CA)

(73) Assignee: Safran Landing Systems Canada, Inc., Ajax (CA)

( * ) Notice: Subject to any disclaimer, the term of this patent is extended or adjusted under 35 U.S.C. 154(b) by 88 days.

(21) Appl. No.: 17/805,418

(22) Filed: Jun. 3, 2022

(65) Prior Publication Data

US 2023/0392701 A1    Dec. 7, 2023

(51) Int. Cl.
*F16K 17/14* (2006.01)
*B64C 25/60* (2006.01)
*F16K 17/02* (2006.01)

(52) U.S. Cl.
CPC .............. *F16K 17/14* (2013.01); *B64C 25/60* (2013.01); *F16K 17/025* (2013.01)

(58) Field of Classification Search
CPC ........ F16K 17/025; F16K 17/14; B64C 25/60
See application file for complete search history.

(56) References Cited

U.S. PATENT DOCUMENTS

| | | |
|---|---|---|
| 2,589,144 A | 3/1952 | Russell et al. |
| 4,082,104 A | 4/1978 | Keeney |
| 4,088,286 A | 5/1978 | Masclet et al. |
| 4,317,470 A | 3/1982 | Taylor |
| 4,587,987 A | 5/1986 | West |
| 2013/0269806 A1* | 10/2013 | Burns ............... B01F 33/50114 137/594 |
| 2021/0024203 A1 | 1/2021 | Chappell et al. |

FOREIGN PATENT DOCUMENTS

CN      217056489 U      7/2023

OTHER PUBLICATIONS

International Search Report and Written Opinion of the International Searching Authority mailed Jul. 25, 2023, issued in corresponding International Application No. PCT/CA2023/050753, filed Jun. 1, 2023, 10 pages.

* cited by examiner

*Primary Examiner* — Paul J Gray
(74) *Attorney, Agent, or Firm* — Christensen O'Connor Johnson Kindness PLLC

(57) ABSTRACT

A fuse pin valve includes a housing, a piston, and a mechanical fuse, such as a fuse pin. As assembled, the piston is movably disposed in the housing and is retained in a static position by the fuse pin. Upon a certain pressure (e.g., an abnormal pressure) acting on the piston, the fuse pin fails, thereby releasing the piston to move from a first or start position to second or end position. In the start position of the piston, the valve is in a first operational state (e.g., a closed state). In the end position of the piston, the valve is in a second operational state (e.g., an open state, fully open states, etc.). In other embodiments, in the start position of the piston the valve is in an open state, and in the end position of the piston the valve is in a closed state.

18 Claims, 15 Drawing Sheets

FUSE PIN VALVE

BACKGROUND

Most aircraft are equipped with landing gear that enables the aircraft to taxi, takeoff and safely land on the ground. In some types of landing gear, shock-absorbing struts are employed to absorb, damp and react forces or loads imposed on the landing gear during landing, taxiing, takeoff, and other operational conditions.

Shock-absorbing struts, sometimes referred to as shock struts, generally accomplish these functions by compressing a fluid within a sealed chamber formed by hollow, telescoping cylinders. The fluid generally includes both a gas and a liquid, in which the liquid may take the form of hydraulic fluid or oil. One type of shock-absorbing strut is generally referred to as an "air-over-oil" or oleo-shock strut where a trapped volume of gas is compressed and a volume of the liquid is metered through an orifice in one of the telescoping cylinders when the shock strut is axially or longitudinally compressed. The gas operates as an energy storage device, similar conceptually to a mechanical spring, so that upon termination of a compressing force, for example, the shock strut returns to its original fully extended length. Shock struts also dissipate energy by passing the liquid through the orifice so that as the shock strut is compressed or extended, its rate of motion is limited by the damping action that occurs from the liquid being forced through the orifice.

In use, the shock strut supports the aircraft body during taxiing and take-off, and absorbs impact energy and/or dampens shocks when the aircraft touches down after flight. When landing, the shock strut absorbs and/or dampens the landing impact energy and aims to prevent any "excessive" force from the landing from being transferred to the body of the aircraft.

Under normal operating conditions, that is, when the shock strut reacts to loads within its design capabilities, the shock strut functions to react and dampen loads imposed on the landing gear as mentioned above. In some instances, however, a landing generates abnormal or excessive loads (e.g., loads far exceeding the design capabilities of the shock strut) upon the aircraft. For example, abnormal or excessive loads may be caused by severely hard landings, crashes, etc. In these instances, conventional shock struts may be insufficient or ineffective in handling such abnormal loads and related impact energy.

One solution to these operational challenges has been disclosed in US Patent Publication 2021/0024203 A1 ("the '203 Publication"), which is presently assigned to Safran Landing Systems, the disclosure of which is incorporated by reference in its entirety. In the '203 Publication, a shock strut is disclosed that comprises a first energy absorption stage and a second energy absorption stage to provide, for example, design flexibility for accommodating a range of descent velocities, aircraft weights, etc. The '203 Publication describes the first energy absorption stage as being configured to absorb normal impact forces that occur during normal landing conditions without aid of the second stage. However, during abnormal landing conditions, where the landing force exceeds normal operational parameters, both the first stage and the second stage work together to absorb the abnormally high impact loads. The '203 Publication discloses that the first stage may be in the form of an oleo-pneumatic strut and the second stage may be in the form of one or more springs disposed in the working chamber of the oleo-pneumatic strut.

SUMMARY

The present disclosure provides examples of a fluid valve, such as a fuse pin valve. In an embodiment, the fluid valve comprises a housing including a bore and a plurality of discharge outlets disposed in fluid communication with the bore and adapted to be exposed to a first pressure, wherein the bore defines a first opening adapted to be coupled to a source of pressurized fluid that is greater than the first pressure. The fluid valve also includes a piston slidably disposed in the bore between a valve closed position in which the plurality of discharge outlets are blocked from communication with the first opening, and a valve open position in which the plurality of discharge outlets are connected in fluid communication with the first opening. The fluid valve further includes a mechanical fuse configured to retain the piston in the valve closed position. In some embodiments, the mechanical fuse is configured to fail once the piston is exposed to a pressurized fluid having a pressure greater than a threshold value. Upon failure, e.g., a shear failure, of the mechanical fuse, the piston transitions from the valve closed position to the valve open position.

In any embodiment, the pressurized fluid is a hydraulic fluid. Alternatively, in any embodiment, the pressurized fluid is a pneumatic fluid.

In any embodiment, the piston travels along an axis of the housing, the mechanical fuse includes a fuse pin, and the mechanical fuse is disposed through the housing and the piston approximately normal to the axis.

In any embodiment, the fuse pin may be arranged with respect to the housing in order to provide a shear failure in one location, also referred to a single shear arrangement.

In any embodiment, the fuse pin may be arranged with respect to the housing in order to provide a shear failure in two locations, also referred to as a double shear arrangement.

In any embodiment, the fluid valve may further include retaining means for retaining the fuse pin in relation to the housing and the piston.

In any embodiment, the retaining means includes one of a press fit, an adhesive, welding, soldering, a lock wire, a deformable band, a deformed housing, an adjustable clamp, or a C-clip.

In any embodiment, movement of the piston includes a first, acceleration stage, in which the piston transitions from a valve closed position to a valve open position, and a second, deceleration stage, which occurs after the valve open position.

In any embodiment, the fluid valve may further comprise means for retarding the movement of the piston during the deceleration stage.

In any embodiment, the means for retarding the movement of the piston includes, for example, a stepped piston snubbing device, one or more metering orifices exposed to the first pressure, a deformable washer disposed in the bore, a mechanical stop disposed at the end of the bore, a stepped shoulder portion formed on the piston and configured to be press fit into a second end opening of the housing, or a stepped shoulder portion formed on the piston and configured to create a broaching effect with respect to the second end opening of the housing.

In accordance with another embodiment, a shock strut of an aircraft is provided. The shock strut may comprise a working cavity containing a hydraulic fluid, a pressure port coupled in fluid communication with the working cavity; and a fluid valve according to any embodiment set forth above. The fluid valve is coupled to the pressure port so that the first opening of the fluid valve is disposed in fluid communication with the working shock strut fluid cavity.

In any embodiment of the shock strut, the threshold pressure is indicative of one of a hard landing of the aircraft or a crash landing of the aircraft.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of a fluid valve suitable for use in regulating fluid flow. In some examples, the fluid valve is of the relief valve type. As such, the fluid valve transitions between a closed state, in which no fluid flow is permitted, to an open state, in which fluid flow is permitted (e.g., pressure release, pressure venting, etc.) once a threshold pressure has been reached. Of course, in other embodiments, the fluid valve is normally in the open state, and is configured to transition to the closed state. In some examples, the fluid valve includes a fuse element, such as a fuse pin, that fails (e.g., shears) upon an abnormal pressure condition and allows the valve to transition from the closed state to the open state or vice versa.

FIGS. 1-13 illustrate various embodiments of a fluid valve, generally designated 120, 220, 320, 420, 520, 620, 720, 820, etc., formed in accordance with aspects of the present disclosure. The fluid valves of the present disclosure may be fluidly coupled to a working fluid, such as hydraulic fluid, of a fluid system. Alternatively, any of the fluid valves may be fluidly coupled to a working gas of a pneumatic system.

Figure 14B:
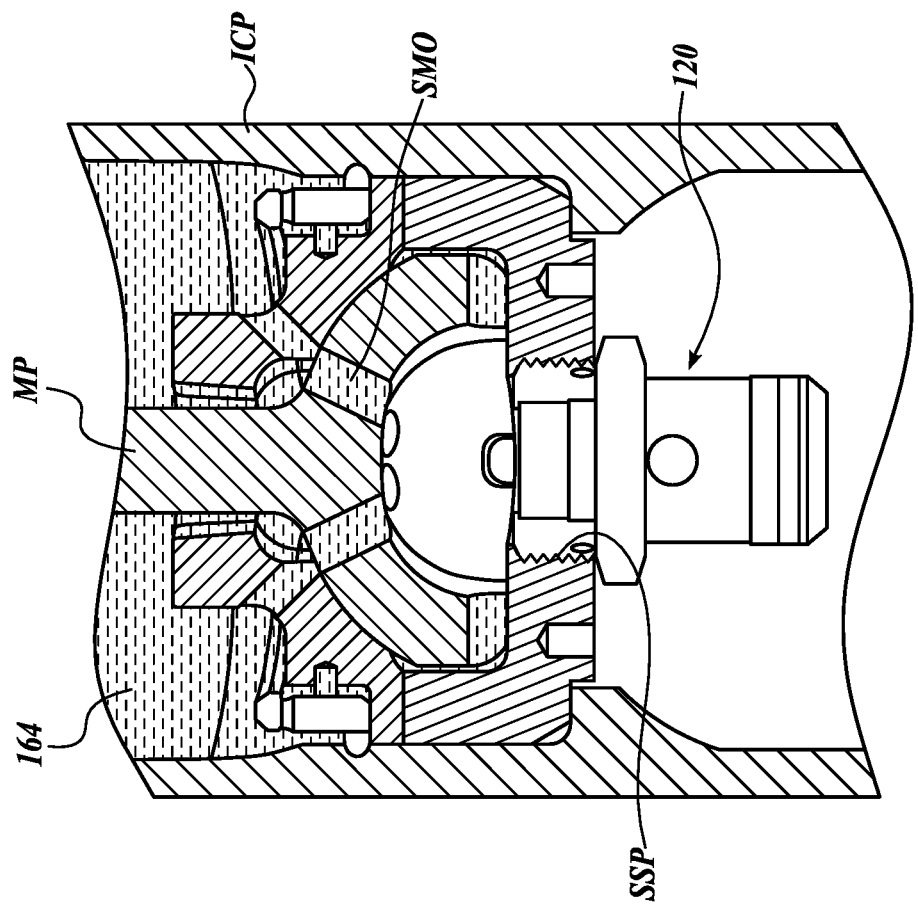
FIGS. 14A-14B illustrate a representative shock strut of an aircraft incorporating an embodiment of the fuse pin valve of the present disclosure.
Figure 14A:
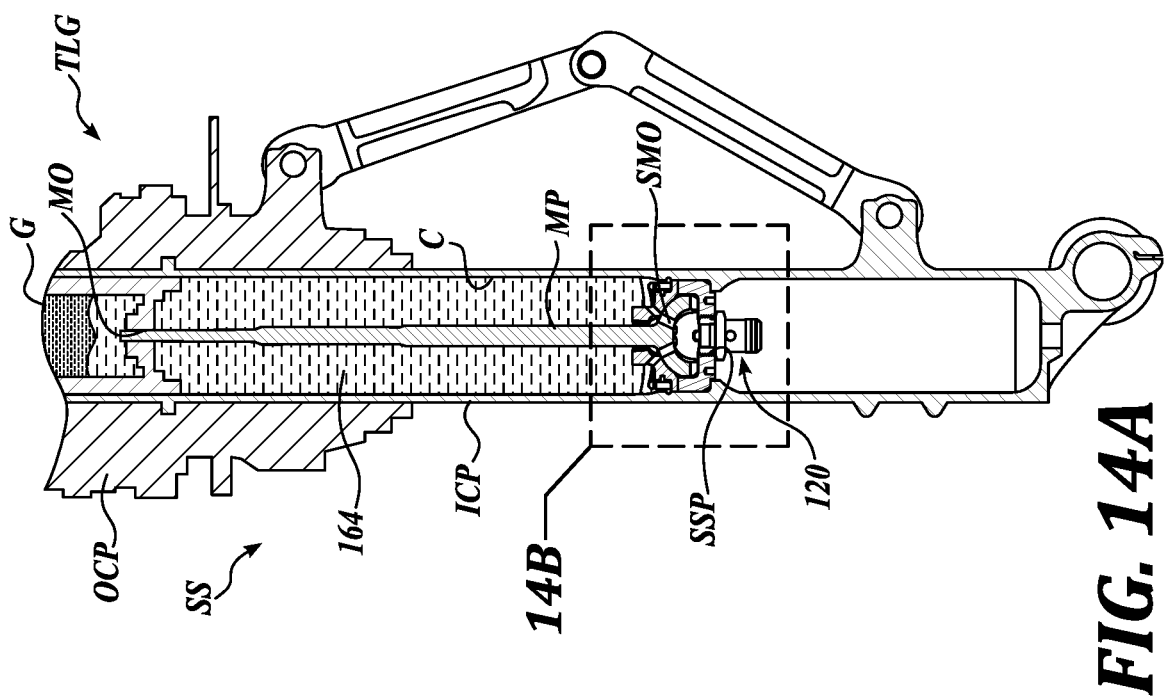
Figure 15A:
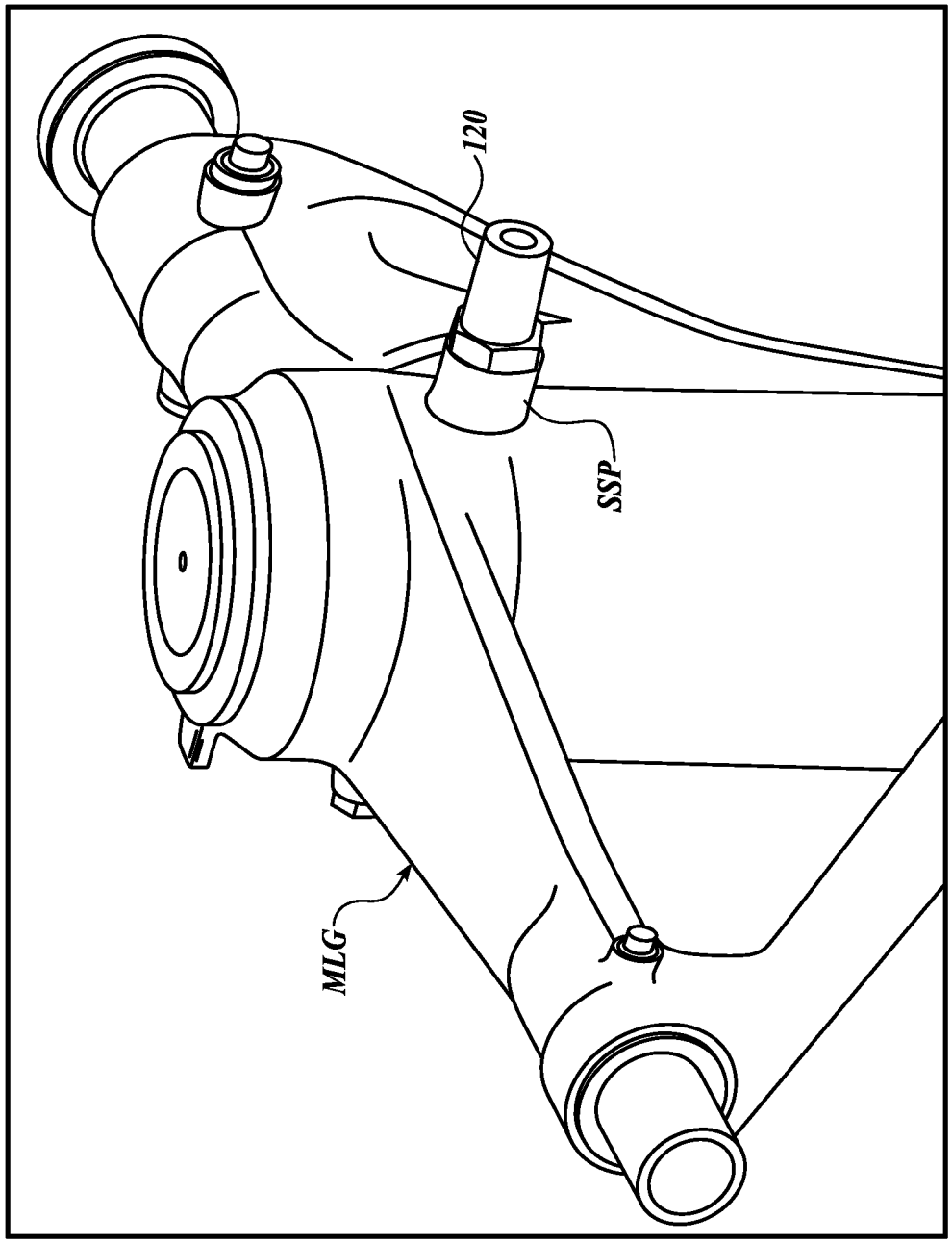
FIGS. 15A-15B illustrate another representative shock strut of an aircraft incorporating an embodiment of the fuse pin valve of the present disclosure.
Figure 15B:
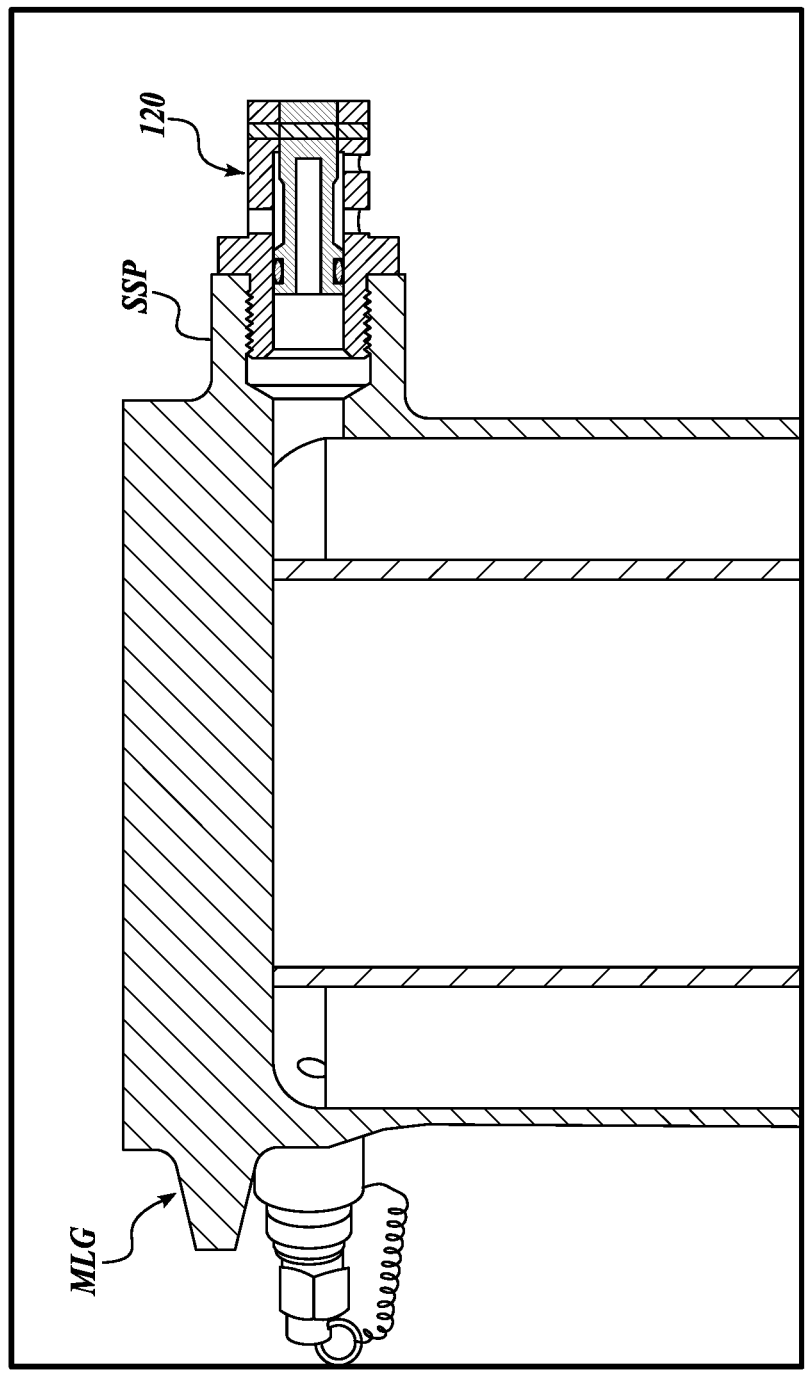

As will be described in more detail below, any one of the disclosed fluid valves is suitable for use in landing gear of an aircraft. For example, the fluid valves are capable of being fluidly coupled to a pressure port P of a shock absorber, such as a shock strut port (SSP) of a landing gear. In one embodiment, the shock strut port SSP is associated with a shock strut of a tail landing gear TLG, as shown in FIGS. 14A-14B. In another embodiment, the shock strut port SSP is associated with a shock strut of a main landing gear MLG, as shown in FIGS. 15A-15B. It will be appreciated that the shock strut port SSP may be also associated with a shock strut of a nose landing gear (not shown). In some embodiments, the pressure port P is a typical aerospace port with straight threads for threadably connecting to the fluid valve.

In some embodiments, the fluid valve is normally in the closed state, and is configured to transition to the open state as quickly as possible in order to dissipate energy from, for example, the shock strut. In some of these embodiments, the fluid valve includes techniques to retard, brake or otherwise decelerate the movement of the valve's actuating member (e.g., piston) after the valve has transitioned to the open state.

Although some embodiments of the present disclosure will be described with reference to a shock strut of an aircraft, one skilled in the relevant art will appreciate that the disclosed embodiments are illustrative in nature and therefore should not be construed as limited to such an environment. It should therefore be apparent that the disclosed valves and components thereof have wide application, and therefore may be suitable for use within many types of environments in which fluid valves are employed. Accordingly, the following descriptions and any illustrations herein should not limit the scope of the claimed subject matter. The fluid valves or any combination of components hereinafter described may be installed in new fluid systems or may be retrofitted in existing fluid systems.

Figure 1:
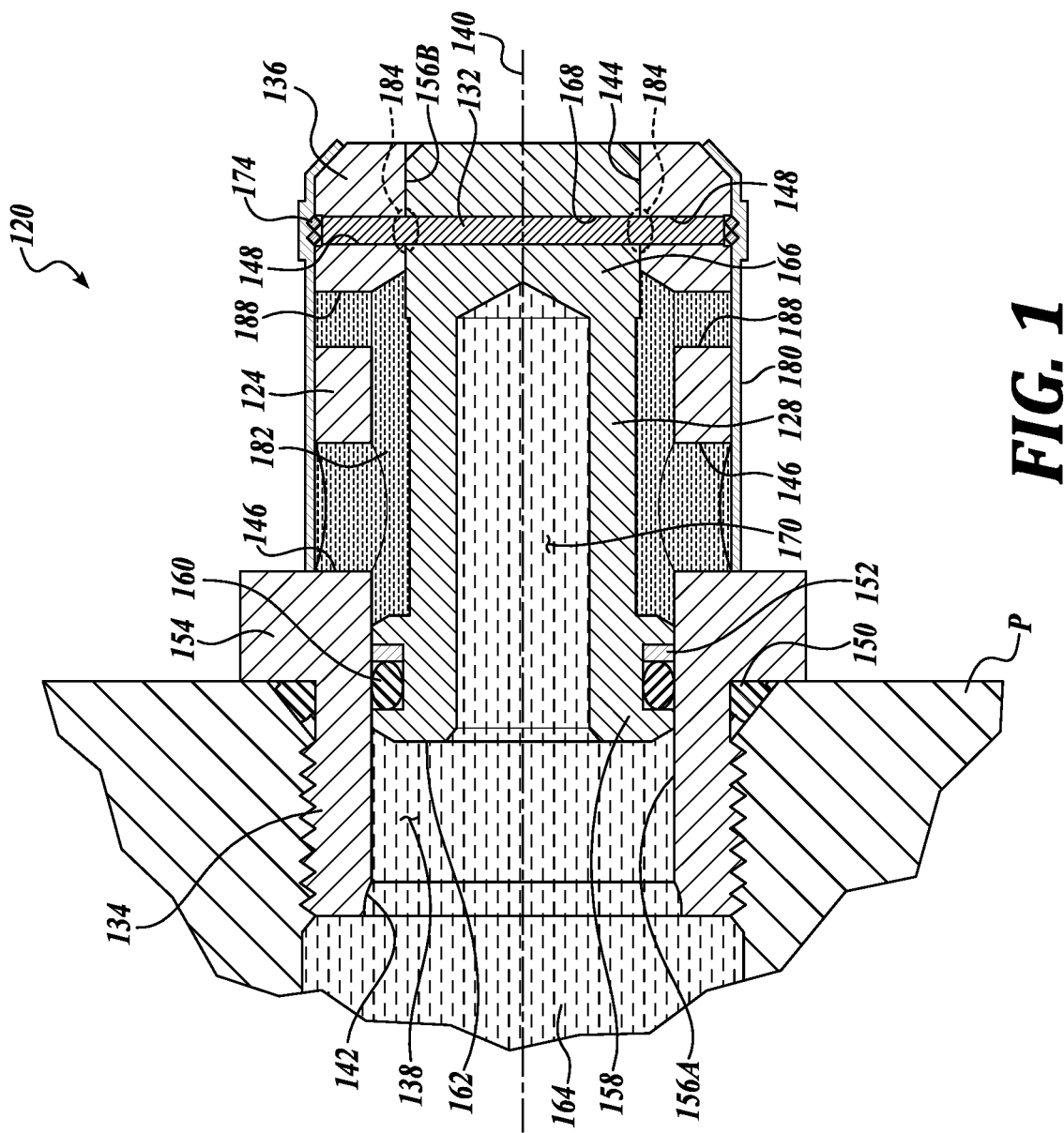
FIG. 1 is a longitudinal cross-sectional view of a fuse pin valve in accordance with an embodiment of the present disclosure, wherein the fuse pin valve is in a first operational state (e.g., a valve closed state)
Figure 2:
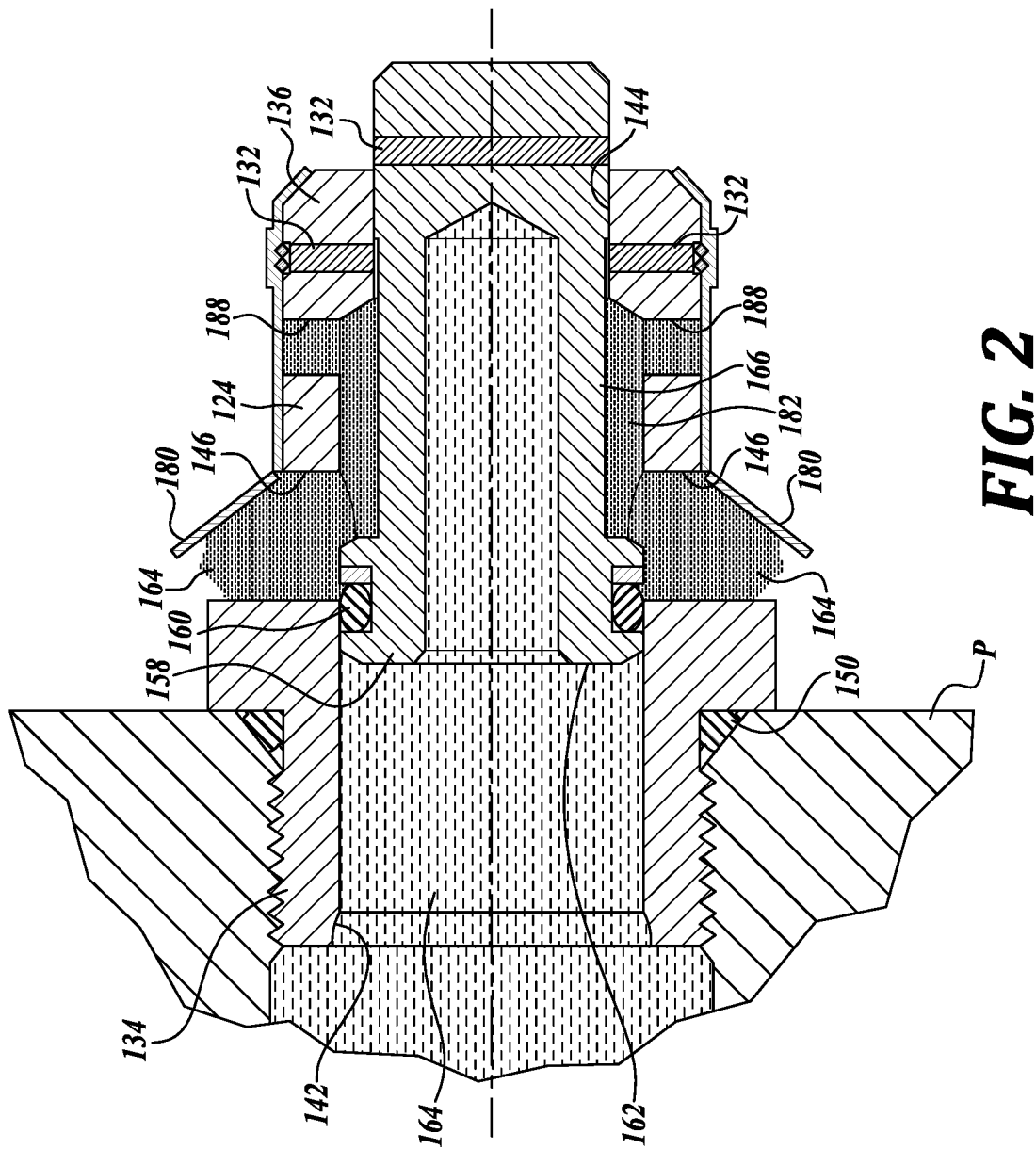
FIGS. 2-4 are longitudinal cross-sectional views of the fuse pin valve of FIG. 1, each of which having the piston position between the first operational state of the valve and the second operational state of the valve shown in, for example FIG. 5.

FIGS. 1-5 illustrate a representative embodiment of the fluid valve 120, referred hereinafter as a fuse pin valve 120 or valve 120, formed in accordance with one or more aspects of the present disclosure. As best shown in FIG. 1, the fuse pin valve 120 includes a housing 124, a piston 128, and a mechanical fuse, such as a fuse pin 132. As assembled, the piston 128 is movably disposed in the housing 124 and is retained in a static position by the fuse pin 132. Upon a certain pressure (e.g., an abnormal pressure) acting on the piston 128, the fuse pin 132 fails, thereby releasing the piston 128 to move from a first or start position shown in FIG. 1, through the transitional positions of FIGS. 2-4, and to second or end position shown in FIG. 5. In the start position of the piston 128, the valve 120 is in a first operational state (e.g., a closed state). In the end position of the piston 128, the valve 120 is in a second operational state (e.g., an open state, fully open state, etc.). In a certain embodiment, the valve 120 may be suitable for use in fluid systems that desire pressure relief or venting capabilities.

Each of the components of the fuse pin valve 120 mentioned above will now be described in more detail. As shown in FIG. 1, the housing 124 includes a first end section 134 and a second end section 136. The housing 124 also includes a through-bore 38 extending along the longitudinal axis 140 of the housing 124, and forming a first end opening 142 at an end of the first end section 34 and a second end opening 144 at the end of the second end section 136. In the embodiment shown, the through-bore 138 has a stepped constant cross-section from the first opening 142 to the second opening 144, and may be referred to herein as either through-bore 138 or stepped through-bore 138. The stepped through-bore 138 is formed by a first bore section that defines the first end opening 142 and a smaller, second bore section that defines the second end opening 144. As such, a mechanical stop is formed that limits or defines the end position of piston travel within the housing 124, as will be described in more detail below.

The housing 124 further includes a number (e.g., 1, 2, 3, 4, etc.) of pressure discharge holes or outlets 146 connected in fluid communication with the through-bore 138. The outlets 146 are positioned around the perimeter of the housing 124 about the longitudinal axis 140, and are disposed through the wall of the housing 124. In the embodiment shown, the outlets 146 are oriented normal to the longitudinal axis 140, although other orientations (e.g., transverse, etc.) may be employed. The outlets 146 may vary in number, size and/or shape depending on the intended application of the valve 120. As will be described in more detail below, the second end section 136 also includes a pair of aligned fuse pin holes 148 for receiving the fuse pin 132 therethrough.

In some embodiments, the first end section 134 is adapted to be removably coupled to a source of a variable pressure, such as a hydraulic pressure port P in fluid communication with a working fluid chamber. In some embodiments, the hydraulic pressure port P is a shock strut port (SSP) for a tail landing gear TLG or a main landing gear MLG, or a Nose Landing Gear (NLG), etc., as briefly described above, and illustrated, for example, in FIGS. 14A-14B and FIGS. 15A-15B, respectively. To that end, the first end section 134 may include external threads for coupling with cooperating internal threads of the port P as shown, for example, in FIG. 1. As briefly described above, the pressure port P in some embodiments is a typical aerospace port with straight threads for threadably connecting to the external threads of the first end section 134 of the housing 124. The connection between the valve 120 and the port P may also include, for example, an optional O-ring 150 or other sealing means. Other removable, and sealable, connections may be practiced with embodiments of the present disclosure.

To improve, for example, sealing between the valve 120 and the port P and/or to aid in the installation or removal of the valve 120, the housing 124 may include an external flange 154 positioned between the first end section 134 and the second end section 136, as shown in FIG. 1. In the embodiment shown, the external flange 150 extends around the entire perimeter of the housing 124. In some embodiments, the flange 150 may have, for example, a hexagonal shape in cross-section to assist in installation or removal of the valve 120 from the port P. Of course, the flange 150 may have other shapes or configurations to assist in installation. For example, the flange 150 may have shapes including but not limited to other polygonal shapes, such as a square, generally rounded cross-section with two flats, generally rounded cross-section with four flats, etc., or the flange may be configured to include a crescent wrench groove, a wire lock, etc. When coupled to the port P, the through-bore 138 is connected in fluid communication with a working fluid (e.g., hydraulic fluid, etc.) of variable pressure via the first opening 142.

Still referring to the cross-sectional view of FIG. 1, the piston 128 is disposed in the though-bore 138 and is configured to be movably supported along axis 140 by the housing 124. As such, the through-bore 138 forms a bearing surface that defines the path of travel of the piston 128. In the embodiment shown, the piston 128 is configured to sealingly contact bearing surfaces 156A, 156B and to allow for sliding movement between the piston and the housing 124. When used in some pressure environments, the piston 128 may contain or include an O-ring 160 in order to provide suitable sealing characteristics to the valve 120. An optional back-up ring 152, such as split ring, may be employed to support the O-ring 160 to prevent, for example, O-ring extrusion under shock strut pressure.

In the embodiment of FIGS. 1-5, the piston 128 is formed with a piston head 158 and a piston rod 166. The piston head 158 is sized and configured to be slidably supported by the bearing surface 156A of the first bore section. Due to the size and configuration of the piston head 158, the bearing surface 156A may also act as a sealing surface. Similarly, the piston rod 166 is sized and configured to be slidably supported by the bearing surface 156B of the smaller, second bore section. The smaller, second bore section in conjunction with the piston head 158 forms the mechanical stop. As will be described in more detail below, the second bore section is sized such that fluid may pass between the piston rod 166 and the bearing surface 156B.

The piston head 158 includes a top surface 162 that faces the first end opening 142. When coupled to the port P, the top surface 162 is exposed to a working pressure from a pressurized, working fluid 164, such as pressurized hydraulic fluid, pressurized pneumatic fluid, etc. As will be described in more detail below, the piston 128 includes a through-bore or enclosed channel 168 spaced apart from the top surface 162. The enclosed channel 168 is configured to be alignable with the pair of fuse pin holes 148 for receiving the fuse pin 132 therethrough. In the embodiment shown, the channel 168 is oriented perpendicular to the axis 140.

In some embodiments, the piston 128 may taper slightly from a position past (i.e., second end side of) the O-ring 160. These arrangements aim to provide for smoother travel of the piston 28 with less potential of binding as the piston 128 transitions from the first operational state of the valve 120 to the second operational state of the valve 120. Additionally or alternatively, the piston 128 may be partially bored out (e.g., hollowed out) from the top surface 162 to form an inner piston cavity 170 in order to lower the mass and inertia of the piston 128. This will provide the piston 128 with a quicker response to pressure input, and thus, a faster operational state change of the valve 120.

As was briefly described above, the fuse pin 132 retains the position of the piston 128 during the first operational state (e.g., closed state) of the valve 120. In the embodiment shown, the fuse pin 132 is a cylindrical rod, although fuse pins with other cross-sections may be employed. To retain the piston 128 in the first operational state, the fuse pin 132 is routed through the pair of fuse pin holes 148 of the housing 124 and the enclosed channel 168 of the piston 128, as shown in FIG. 1.

The fuse pin 132 can be retained in place by any suitable retention technique or retention means, some of which may include but are not limited to a press fit between the fuse pin and the housing and/or the piston, insertion of a lock wire or cotter pin through the end(s) of the fuse pin, rivet-like deformation of the end(s) of the fuse pin, an adhesive, welding or soldering, lock wire wrapped over the ends of the holes/channel, a deformed housing, a deformable band, such as an Oetiker® clamp, an adjustable clamp, a C-clip, etc. In the embodiment shown, lock wire 174 has been wrapped around the housing 124 adjacent the outer openings of the fuse pin holes 148.

In some embodiments, the fuse pin 132 can be additionally or alternatively retained in place by a thin protective covering 180, such as heat shrink tubing, aluminum speed tape, etc., that encircles or encloses the second end section 136 of the housing 124. In some of these embodiments, the protective covering 180 also covers the discharge outlets 146, thereby preventing ingress of contaminants (e.g., dirt, water, etc.). In some embodiments, grease 182 or other suitable media can be injected into the pressure discharge outlets 146 prior to placement of the protective covering 180 to minimize condensation build-up (and potentially ice formation) as well as providing an additional barrier to external contaminants.

In some embodiments, the housing 124 is integrally formed from a rigid and anti-corrosive metal, such as stainless sreeel. In some embodiments, the piston 128 is integrally formed from a rigid and anti-corrosive metal, such as stainless steel. In some embodiments, the fuse pin 132 is constructed of a rigid metal, with a hardness somewhat lower than the hardness of the piston and the housing. For example, in some embodiments, the hardness of the fuse pin is about Rc 35 and the hardness of the housing and/or the piston is about Rc 40. In some embodiments, the housing 124, the piston 128 and the fuse pin 132 are constructed of similar materials, such as stainless steel, to reduce any negative effects due thermal expansion and corrosion. Each of the materials chosen for the housing, the piston, and/or the fuse pin preferably has high fatigue life with zero yielding at normal pressures. The operation of an embodiment of the fuse pin valve 120 will now be briefly described with reference to FIGS. 1-5. For this embodiment, the valve 120 is normally in a closed position, as shown in FIG. 1. In the closed position, the first end opening 142 of the housing 124 is connected in fluid communication with the pressurized fluid 164 via the port P so that pressure is exerted against the top surface 162 of the piston head 158 (and the optional inner piston cavity 170), the discharge outlets 146 are exposed to atmospheric pressure or to a pressure lower than the pressurized fluid 164, the piston 128 is positioned so as to block the discharge outlet(s) 146, and the piston 128 is retained in place by the fuse pin 132. In other words, the fuse pin 132 retains the piston 128 in place by opposing the load exerted against the piston 128 by the pressurized fluid 164. In some embodiments, one or more sealing means, such as O-rings 150, 160, are provided to prevent or minimize external pressure leakage.

Figure 5:
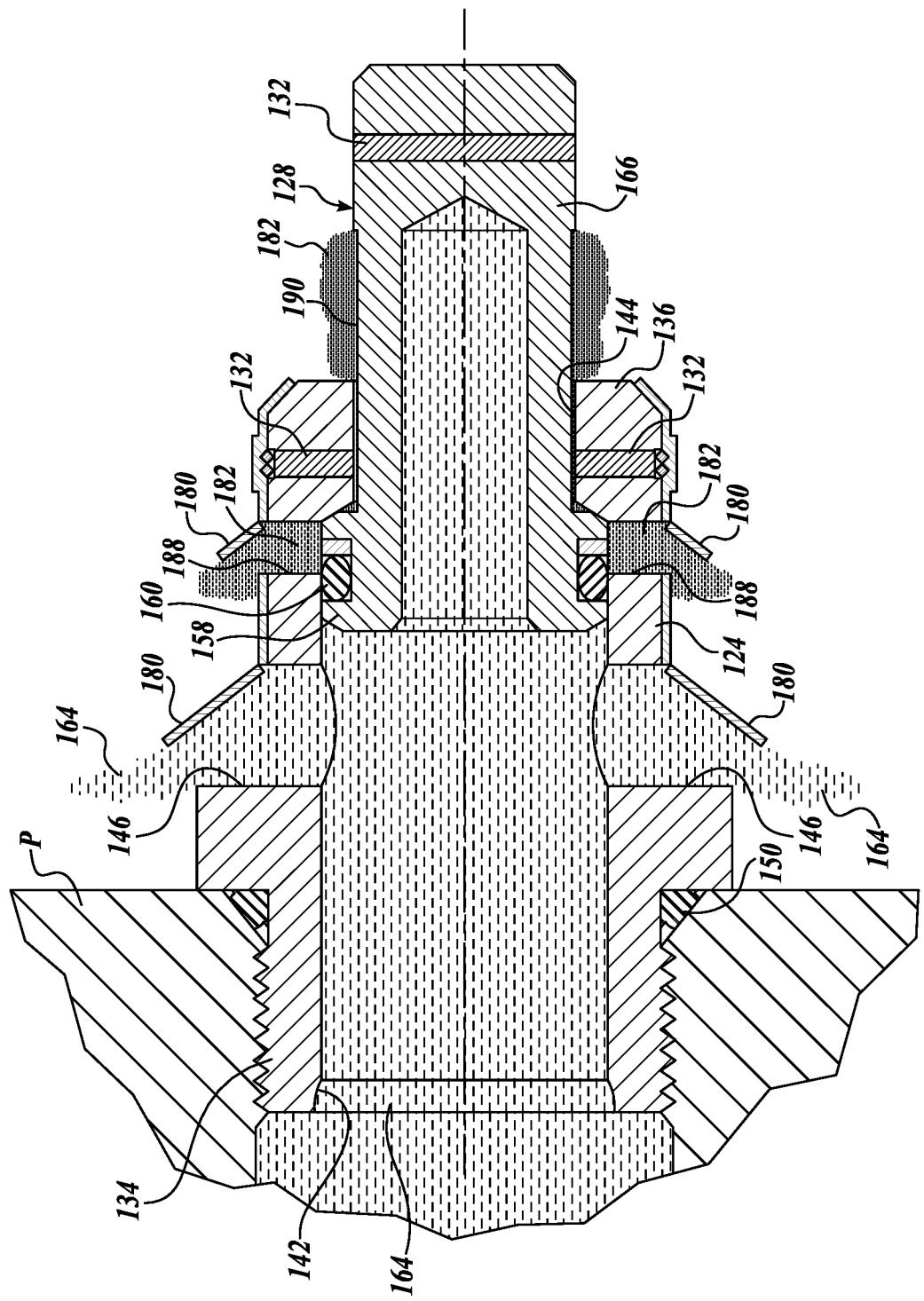
FIG. 5 is another longitudinal cross-sectional view of the fuse pin valve of FIG. 1, wherein the fuse pin valve is in a second operational state (e.g., a valve open state; a valve fully open state, etc.)

Actuation of the valve 120 may be triggered once the pressure of the pressurized fluid 164 has exceeded a certain threshold pressure (e.g., an abnormal pressure). Activation of the valve 120 transitions the valve from a closed state shown in FIG. 1 to a fully open position as shown in FIG. 5. For example, when the pressure of the pressurized fluid 164 exceeds a certain threshold pressure, a shearing force is exerted on the fuse pin 132 at both transition locations 184 that is greater than the shear capability of the fuse pin 32, thereby causing the fuse pin 132 to fail (e.g., shear). To ensure shearing in some embodiments, the fuse pin 132 is constructed of a material having a hardness somewhat lower than the hardness of the housing 124 and the piston 128. In embodiments in which the fuse pin 132 is constructed of the same or similar material as the housing 124 and the piston 128, shearing of the fuse pin is ensured by the geometry, e.g., the diameter, of the fuse pin.

Once the fuse pin 132 fails by shearing, the piston 128 is unrestrained and thus, is permitted to move toward the second end opening 144 of the housing 124 as shown in FIGS. 2-5. In some embodiments, the length of the piston 128 and the position of the discharge outlet(s) 146 along the longitudinal axis 140 are chosen so as to ensure that the fuse pin 132 has completely sheared before any pressurized fluid 164 is released through the discharge outlet(s) 146.

Figure 3:
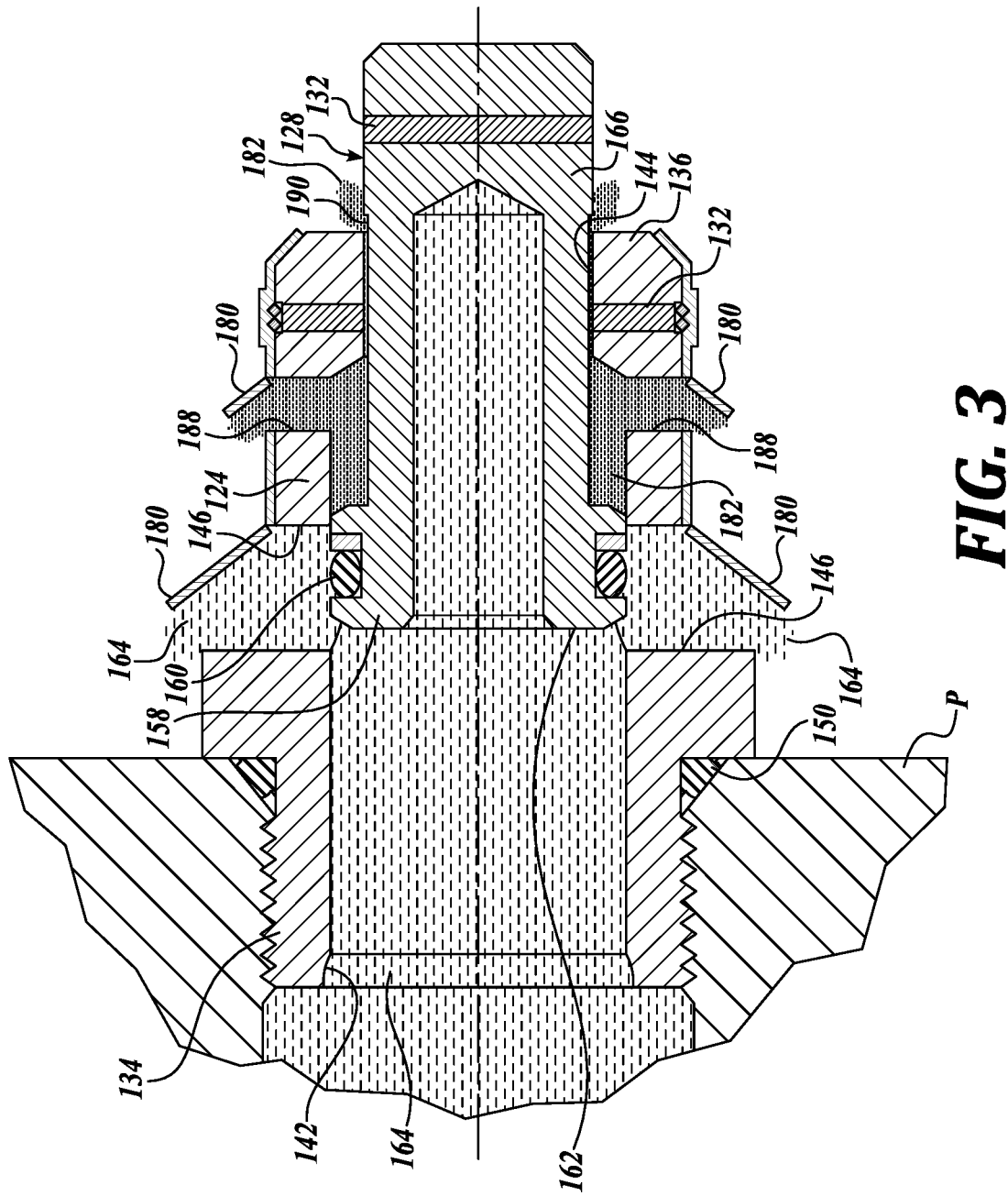
Figure 4:
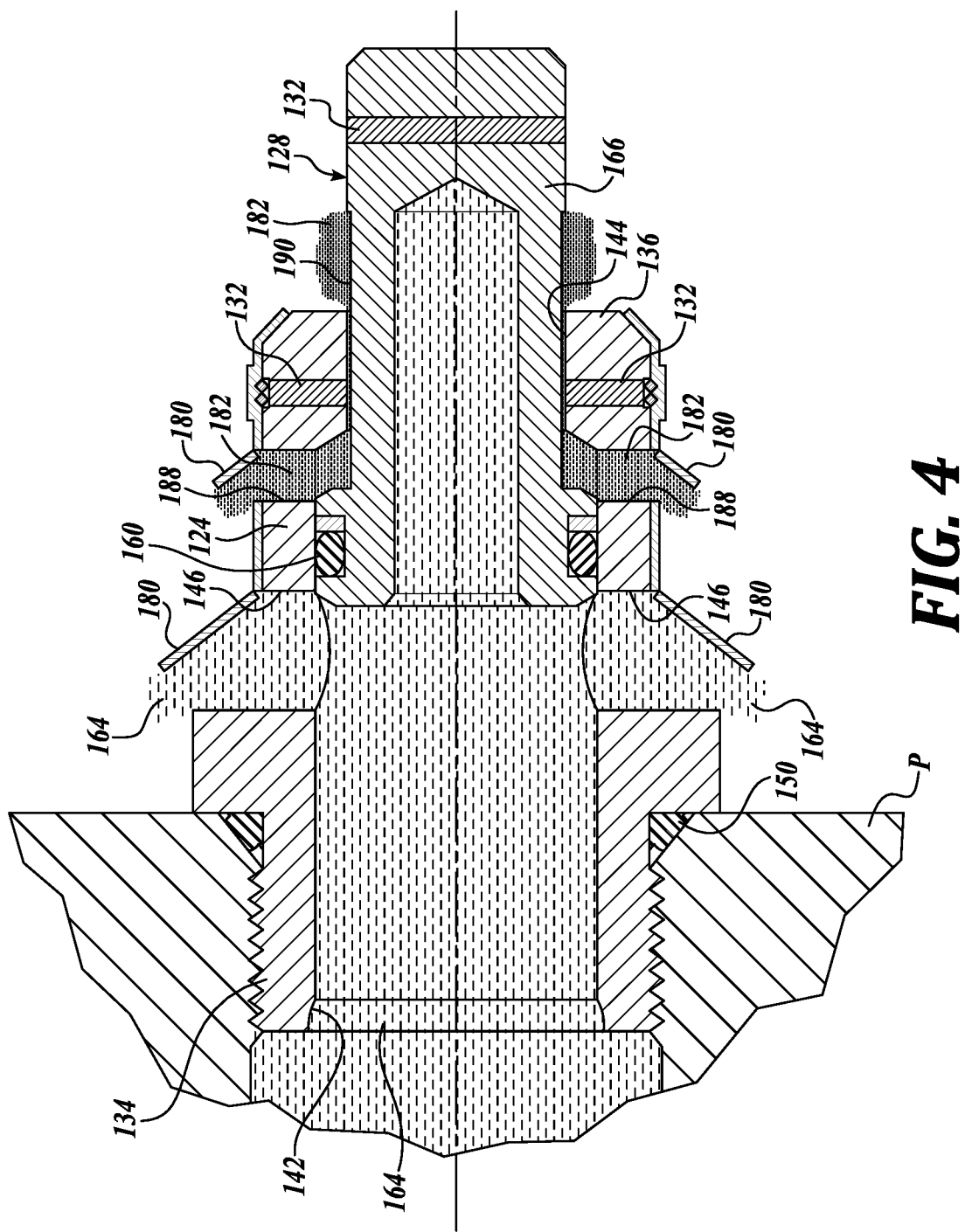

As soon as the piston 128 moves past the first end opening side of the discharge outlet(s) 146, as shown in FIG. 3, pressurized fluid 164 begins to release through the discharge outlet(s) 146. In embodiments that employ the optional protective covering 180, it will be appreciated that the protective covering 180 is configured to provide a negligible resistance to the pressure exerted by the pressurized fluid 164 (i.e., the pressure of the pressurized fluid greatly exceeds the strength of the protective covering 180), thereby rupturing or breaking away and allowing the pressurized fluid 164 to rapidly discharge, as shown in FIG. 3. The piston 128 continues to move via flow momentum and fluid pressure to a fully open position as shown in FIG. 4. In the fully open position of FIG. 4, the piston 128 has moved to a position that completely exposes the discharge outlets 146 to the pressurized fluid 164.

Of course, the fuse pin release pressure (i.e., the threshold pressure) can be selected based on the intended application of the valve 120. In some embodiments, the valve 120 may find suitable use in a shock strut of a landing gear. For example, the valve 120 may be coupled to or integrally formed with, for example, a hydraulic or shock strut port (SSP) of a landing gear, such as a tail landing gear TLG shown in FIGS. 14A-14B. In that regard, the shock strut SS may include an inner cylinder portion (ICP) slidably coupled in an outer cylinder portion (OCP). The inner and outer cylinder portions together define an internal cavity (C), which contains a fluid (F) comprised of a hydraulic fluid, such as pressurized fluid 64, contained in a lower portion thereof and a gas (G) contained in an upper portion thereof. The shock strut (SS) also includes a metering orifice (MO) and a metering pin (MP). At the lower axial end of the metering pin (MP), secondary metering orifices (SMOs) are provided. These secondary metering orifices are in hydraulic fluid communication with the shock strut port (SSP). As such, the first end opening of the valve 120 is connecting to the pressurized (hydraulic) fluid 164.

In accordance with an aspect of the disclosure, there may be a desire in some applications to retard, brake or otherwise decelerate the movement of the piston 128 after the valve has transitioned to the open state. In these embodiments, the fuse pin valve 120 may be configured to open as fast as possible during a first piston travel phase (e.g., piston acceleration phase) and then slowed or decelerated during a second piston travel phase (e.g., a piston braked or retarded motion phase) to prevent potential failure of, for example, the housing 124 or piston head 158 due to, for example, piston impact induced stresses.

In the embodiments shown in FIGS. 1-5, the fuse pin valve 120 includes a technique or means for decelerating the piston 128 (sometimes referred to herein a piston retarder). As shown in FIGS. 1-5, the piston retarder is formed by a grease medium 182 occupying the cavity created between the reduced cross section of the piston rod 164 and the bearing surface 156A, as well as one or more grease discharge holes 188 disposed, for example, axially (i.e., longitudinally) between the pressure discharge outlets 146 and the fuse pin 132. As will be described in more detail below, the discharge holes 188 act like metering orifices, providing a damping force against the moving piston.

The operation of the piston retarder of the valve 120 will now be described in some detail with regard to FIGS. 1-5. As the piston 128 transitions from the position shown in FIG. 2 to the position shown in FIG. 3, the size of the space or cavity occupied by the grease 182 is reduced. This forces the grease 182 toward the second end section 136 of the housing 124 and out through the grease discharge holes 188 and the gap formed between the piston rod 166 and the second end opening 144. Again, the optional protective sheath 180 is configured to rupture and break away, allowing the grease to be forced out of the holes 188. Similar to the damping action from hydraulic fluid forced through the metering orifice in a shock strut, the grease 182 being forced through the discharge holes 188 provide damping to the movement of the piston 128, thereby applying a braking or retarding force thereagainst.

Various parameters of the fuse pin valve 120 can be changed to affect the retarding force created by the piston retarder. For example, the size and number of the discharge holes 188, the compressibility of the grease medium, the size of one or more sections of the piston, the travel distance of the piston, etc. can be used to modify the retarding force for specific applications. Other techniques or means for decelerating the piston (e.g., piston retarders) may be practiced with embodiments of the present disclosure.

In some examples, the piston rod 166 may have a section 190 with a cross-section that is smaller than the second end opening 144. Accordingly, the second end opening 144 may act like an additional metering orifice for the grease 182. In that regard, the piston section 190 acts like a metering pin as the piston rod 166 moves through the second end opening 144. Thus, as the piston 128 transitions from the open position of FIG. 3, to the fully open position of FIG. 4, and to a piston overtravel position of FIG. 5, grease 182 is metered through the second end opening 144, thereby providing additional damping capabilities to the valve 120. Of course, in some embodiments, the discharge holes 188 may be omitted so that the second end opening is the only metering orifice.

In FIGS. 14A-14B, the valve 120 is closed during normal operating pressures of the shock strut and is open during abnormal operating pressures. Thus, actuation of the valve 120 may be triggered when the applied load to the landing gear exceeds, for example, a maximum load, or when the hydraulic pressure of the working fluid in the internal cavity C exceeds, for example, a maximum value that is indicative of an abnormal pressure. For example, the valve 120 can be configured such that a severely hard landing condition or a crash-landing condition triggers the valve 120 to open and vent pressurized hydraulic fluid 164 from the internal cavity C. This venting may direct the vented fluid to atmosphere. Venting of this pressure will assist in dissipating excessive energy from the hard landing or crash landing.

In some embodiments, the trigger or rupture pressure (i.e., the pressure at which the fuse pin fails) is in a range of between about 2,000 psi and about 8,500 psi. In some embodiments, the valve is configured to operate with hydraulic fluid working temperatures of between −54 C (−65 F) and 71 C (160 F), and a maximum operating temperature of about 107 C (225 F). Of course, valves of the present disclosure may be suitable for use in other temperature environments.

Figure 6:
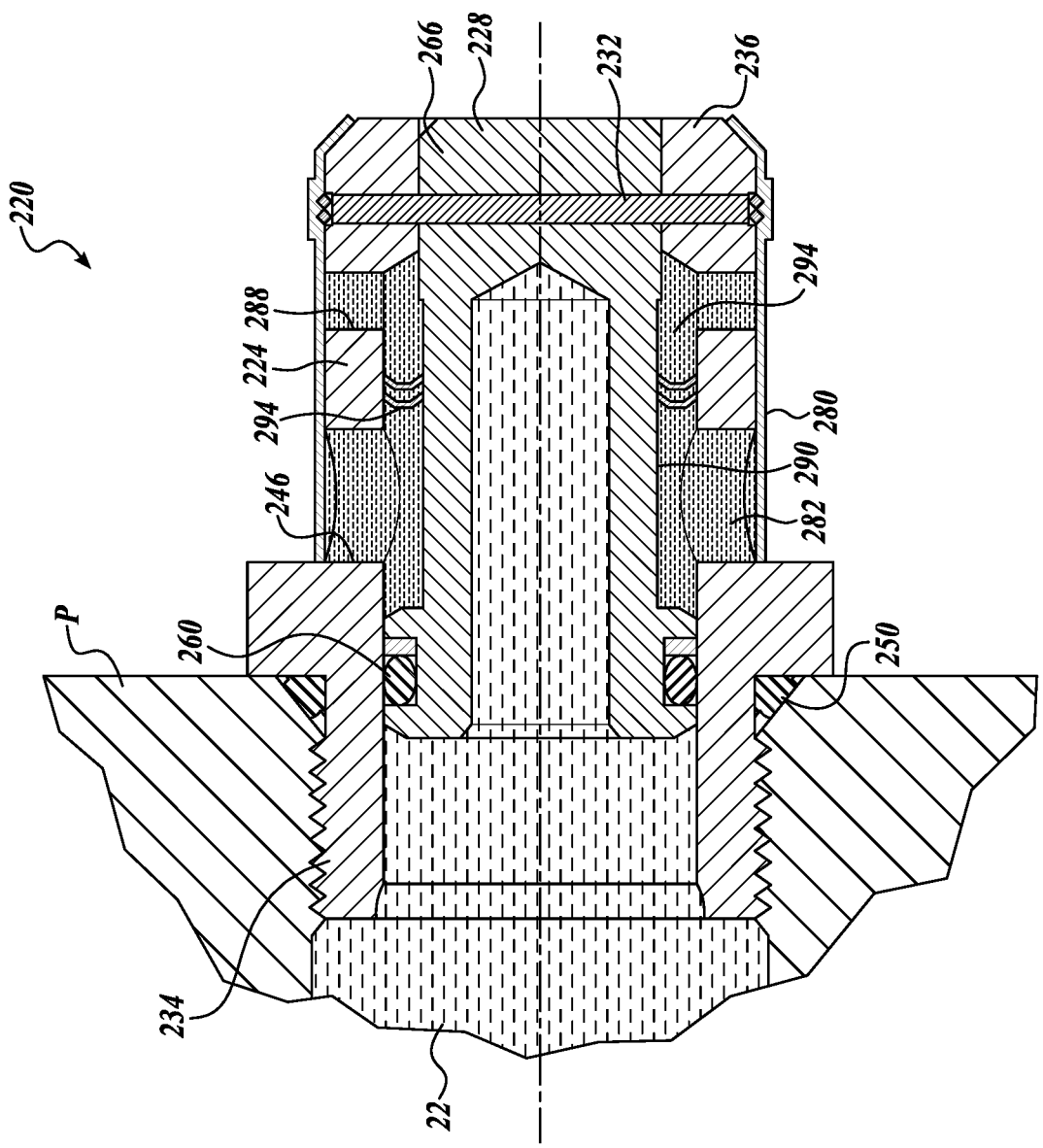
FIG. 6 is a longitudinal cross-sectional view of a fuse pin valve in accordance with another embodiment of the present disclosure.

FIG. 6 illustrates another embodiment of a fuse pin valve, generally designated 220, formed in accordance with aspects of the present disclosure. The fuse pin valve 220 is substantially similar in construction and operation as the fuse pin valve 120 described above with regard to FIGS. 1-5, except for the differences that will be described in more detail below. Components of the fuse pin valve 220 shown in FIG. 6 that are labeled with reference number 2XX correspond to similar components labeled with reference number 1XX in FIGS. 1-5, except as noted. For example, the fuse pin 232 shown in FIG. 6 is similar to the fuse pin 132 shown in FIG. 1 unless otherwise described.

In the embodiment of FIG. 6, in addition to the piston retarder associated with the valve 120 or in the alternative thereto, the piston retarder of the valve 220 is formed by one or more springs 294 disposed around the piston rod 266. The one or more springs 294 can be Belleville washers, crush washers, etc. as shown, or may be of a conventional coil spring type, rubber bushing, etc. In some embodiments, the one or more springs 294 may be additionally employed with the discharge holes 288 and/or piston section 290. In other embodiments, the one or more springs 294 may be alternative employed instead of the discharge holes 288 and/or piston section 290. In use, the one or more springs compress as the piston 228 moves to the overtravel position, thereby absorbing energy.

Figure 7:
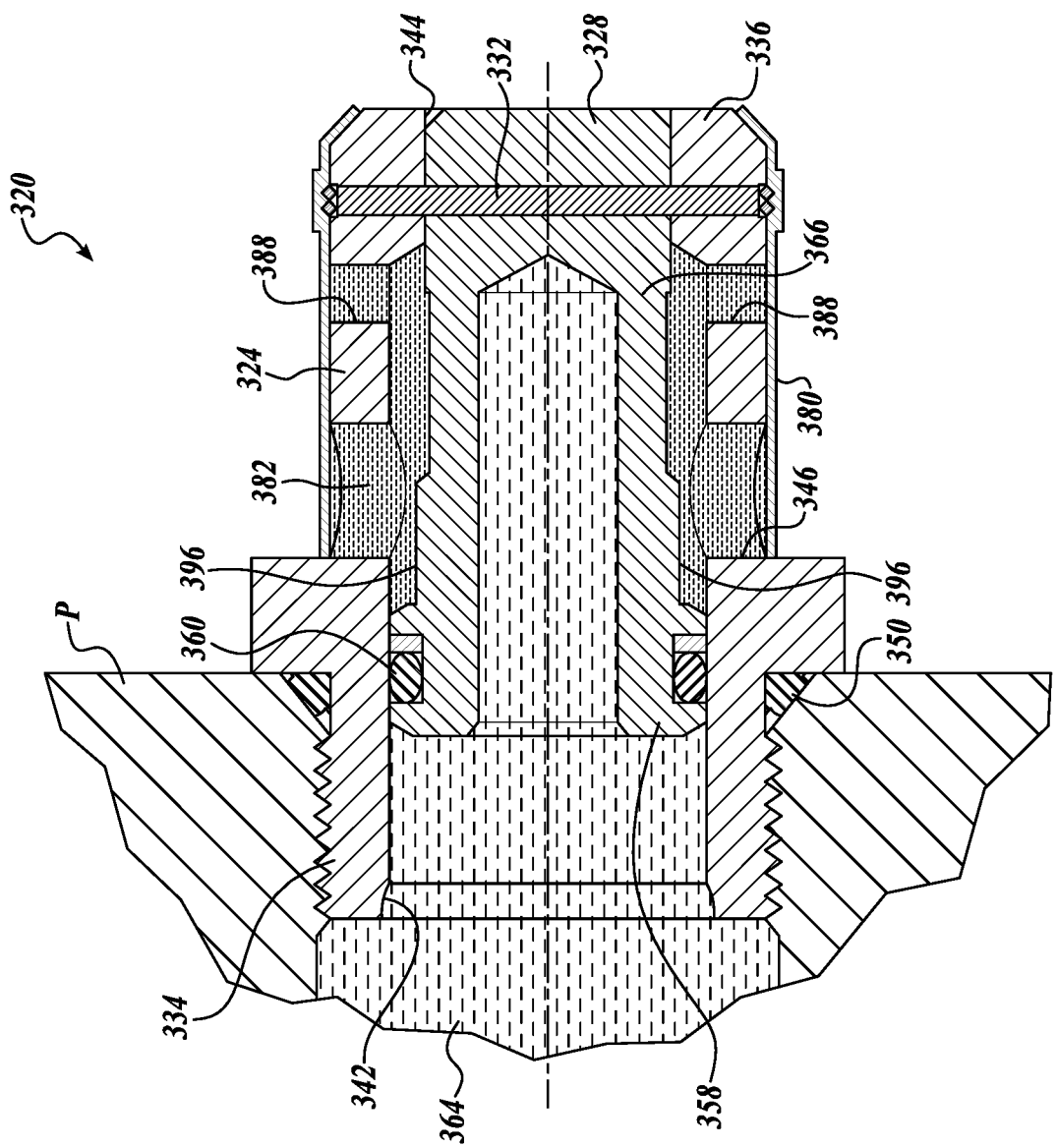
FIG. 7 is a longitudinal cross-sectional view of a fuse pin valve in accordance with another embodiment of the present disclosure.

FIG. 7 illustrates another embodiment of a fuse pin valve, generally designated 320, formed in accordance with aspects of the present disclosure. The fuse pin valve 320 is substantially similar in construction and operation as the fuse pin valve 120 described above with regard to FIGS. 1-5, except for the differences that will be described in more detail below. Components of the fuse pin valve 320 shown in FIG. 7 that are labeled with reference number 3XX correspond to similar components labeled with reference number 1XX in FIGS. 1-5, except as noted. For example, the fuse pin 332 shown in FIG. 7 is similar to the fuse pin 132 shown in FIG. 1 unless otherwise described.

In the embodiment of FIG. 7, in addition to the piston retarder associated with the valve 120 or in the alternative thereto, the piston retarder of the valve 320 is formed by a stepped section 396 of increased cross-section formed on the piston rod 366. In the embodiment shown, the stepped section 396 is disposed adjacent the piston head 358, although the stepped section may be spaced apart from the piston head 358. In some embodiments, the stepped section is configured to cause an interference fit with the second end opening 344. Thus, in operation, a retarding force is generated as the stepped section continually engages with the second end opening 344. It will be appreciated that the stepped section 396 may be slightly tapered to tune the retarding force generating thereby for different applications.

In other embodiments, the stepped section 396 is configured to form a snubbing-like device with the discharge holes 388 and/or the second end opening 344 of housing 324. In this embodiment, additional rows (in the axial direction) of discharge holes 388 may be employed. The discharge holes 388 may be varied in size and number to tune the retarding force generating thereby for different applications. In other embodiments, the discharge holes 388 may be omitted. In these embodiments, all of the metering of the grease is via the interaction between second end opening 344 of housing 324 and the stepped section 396 of the piston 328.

Figure 8:
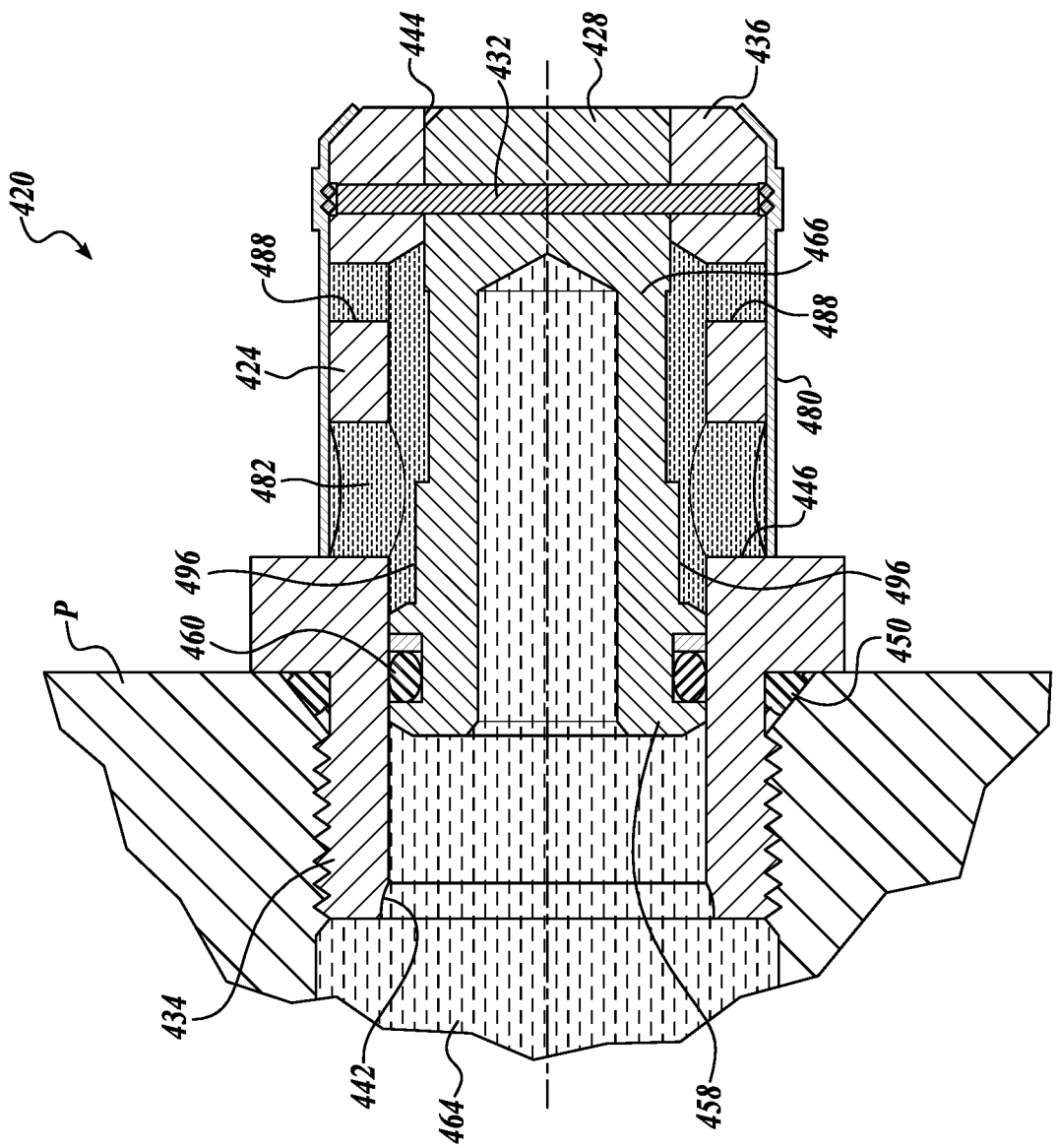
FIG. 8 is a longitudinal cross-sectional view of a fuse pin valve in accordance with another embodiment of the present disclosure.

FIG. 8 illustrates another embodiment of a fuse pin valve, generally designated 420, formed in accordance with aspects of the present disclosure. The fuse pin valve 420 is substantially similar in construction and operation as the fuse pin valve 120 described above with regard to FIGS. 1-5, except for the differences that will be described in more detail below. Components of the fuse pin valve 420 shown in FIG. 8 that are labeled with reference number 4XX correspond to similar components labeled with reference number 1XX in FIGS. 1-5, except as noted. For example, the fuse pin 432 shown in FIG. 8 is similar to the fuse pin 132 shown in FIG. 1 unless otherwise described.

In the embodiment of FIG. 8, in addition to the piston retarder associated with the valve 120 or in the alternative thereto, the piston retarder of the valve 420 is formed by a stepped section 496 of increased cross-section formed on the piston rod 466. In the embodiment shown, the stepped section 496 is disposed adjacent the piston head 458, although the stepped section may be spaced apart from the piston head 458. In some embodiments, instead of tapering the second end opening side of the stepped section like the embodiment shown in FIG. 7, the stepped section 496 is configured with sharp edges to cause a broaching effect with the second end opening 444. Thus, in operation, a retarding force is generated as the stepped section shears off material as it engages with the second end opening 444. In some embodiments, the stepped section 496 extends around the entire perimeter of the piston rod 466. In other embodiments, the stepped section 496 may extend around one or more portions of the perimeter of the piston rod 466.

Figure 9:
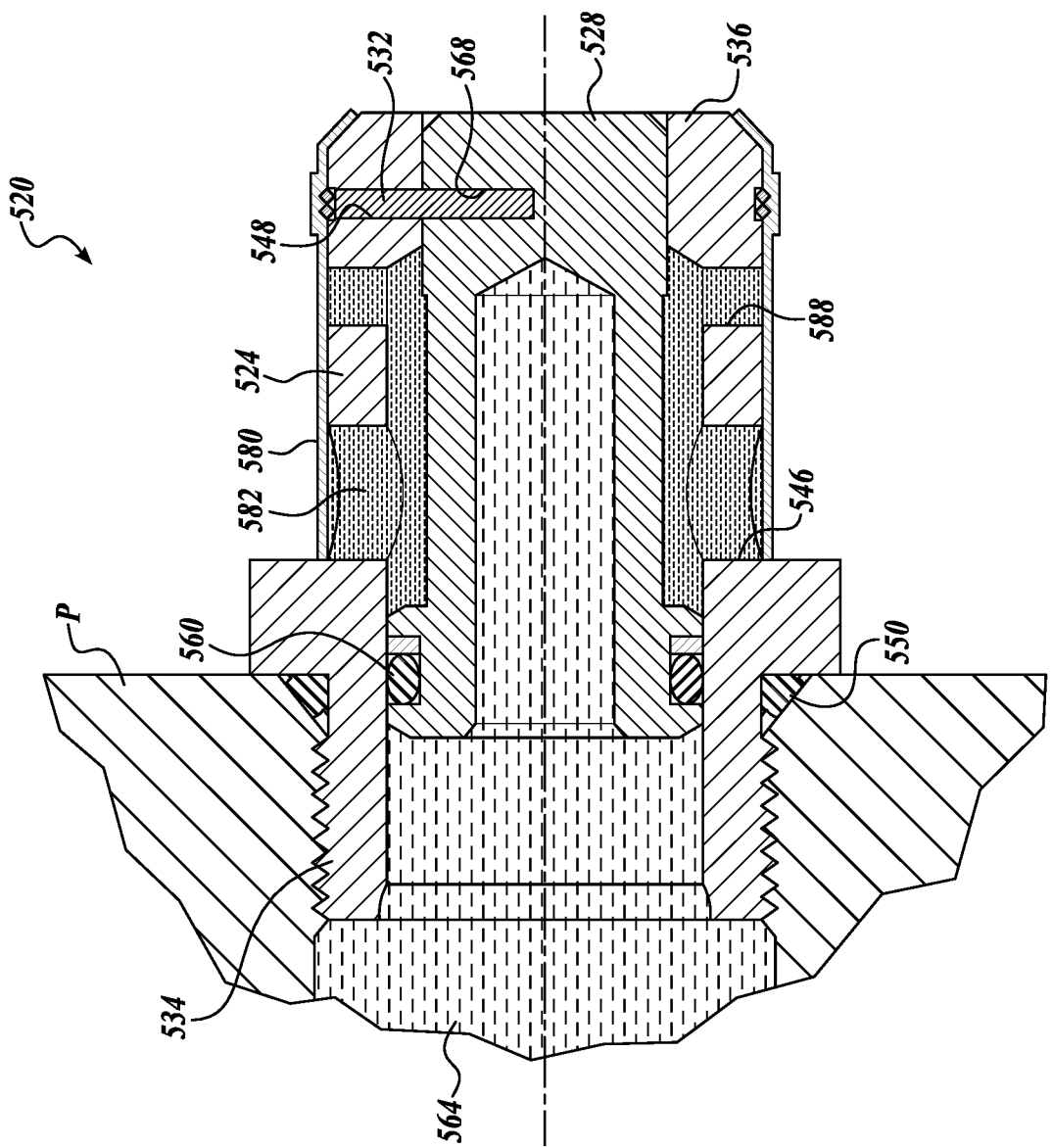
FIG. 9 is a longitudinal cross-sectional view of a fuse pin valve in accordance with another embodiment of the present disclosure.

FIG. 9 illustrates another embodiment of the fuse pin valve, generally designated 520, formed in accordance with aspects of the present disclosure. The fuse pin valve 520 is substantially similar in construction and operation as the fuse pin valve 520 described above with regard to FIGS. 1-5, except for the differences that will be described in more detail below. Components of the fuse pin valve 520 shown in FIG. 9 that are labeled with reference number 5XX correspond to similar components labeled with reference number 1XX in FIGS. 1-5, except as noted. For example, the pressurized fluid 564 shown in FIG. 9 is similar to the pressurized fluid 164 shown in FIG. 1 unless otherwise described.

In the embodiments shown in FIGS. 1-5, the fuse pin 132 extends entirely through the housing 124 and the piston 128, thereby creating two shearing locations. As such, the fuse pin valve 120 may be referred to as having a double shear arrangement. In the embodiment shown in FIG. 9, the fuse pin 532 extends only through one side of the housing 524 and partially into the piston 528. In this embodiment, only one shearing location is created. As such, the housing 524 only includes one fuse pin hole 548 and the channel 568 of the piston 528 only extends partially into the piston. As such, the fuse pin valve 520 may be referred to as having a single shear arrangement.

Figure 10:
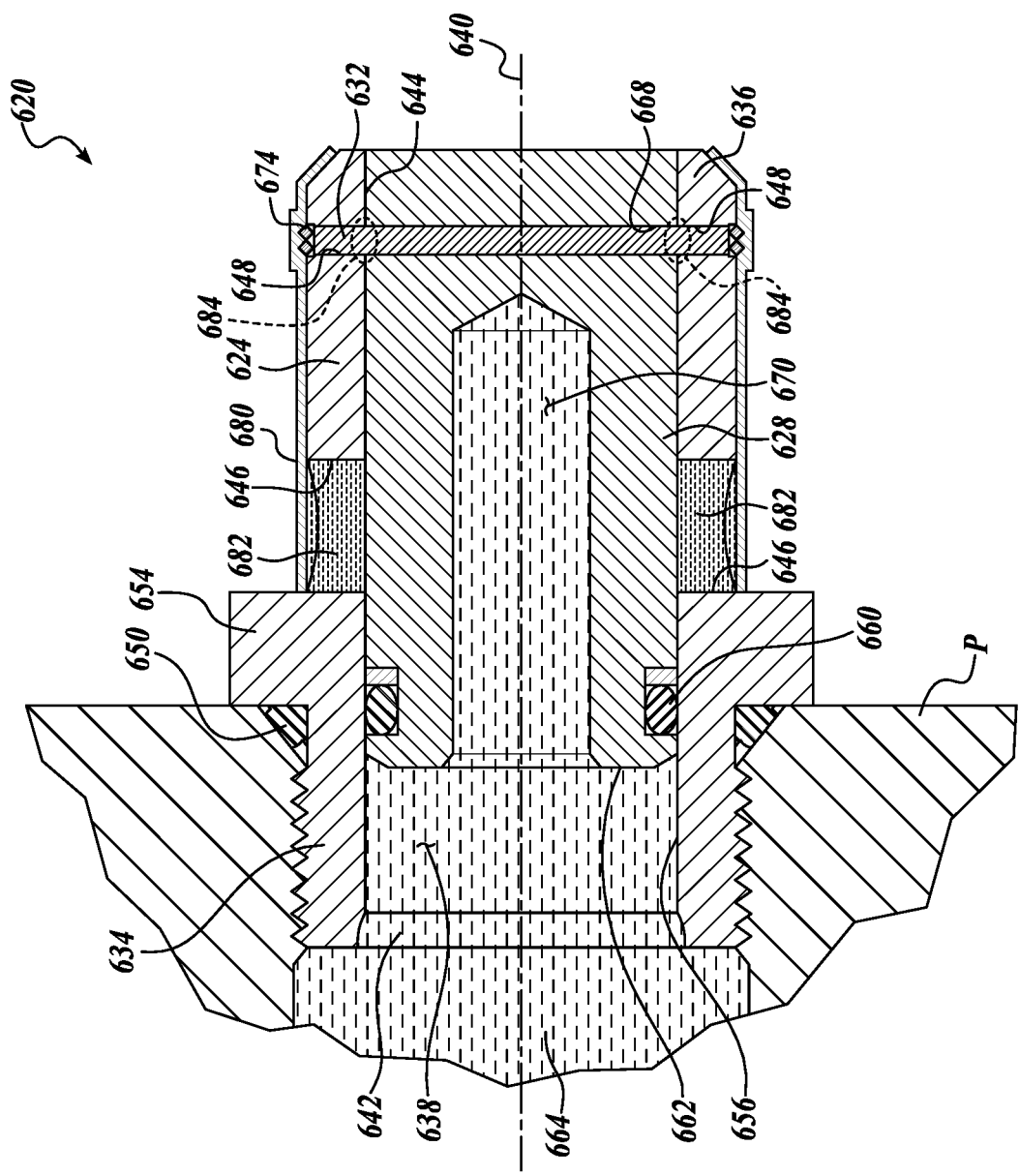
FIG. 10 is a longitudinal cross-sectional view of a fuse pin valve in accordance with another embodiment of the present disclosure.

FIG. 10 illustrates another embodiment of a fuse pin valve, generally designated 620, formed in accordance with aspects of the present disclosure. The fuse pin valve 620 is substantially similar in construction and operation as the fuse pin valve 120 described above with regard to FIGS. 1-5, except for the differences that will be described in more detail below. Components of the fuse pin valve 620 shown in FIG. 10 that are labeled with reference number 6XX correspond to similar components labeled with reference number 1XX in FIGS. 1-5, except as noted. For example, the fuse pin 632 shown in FIG. 10 is similar to the fuse pin 132 shown in FIG. 1 unless otherwise described. As shown in FIG. 10, the through bore 638 of the fuse pin valve 620 has a constant cross-section. As such, the mechanical stop formed by piston interference with the second end opening 644 has been omitted. Similarly, a piston retarder, such as any of the piston retarders illustrated in the embodiments of FIGS. 1, 6, 7, and 8, has been omitted.

Figure 11:
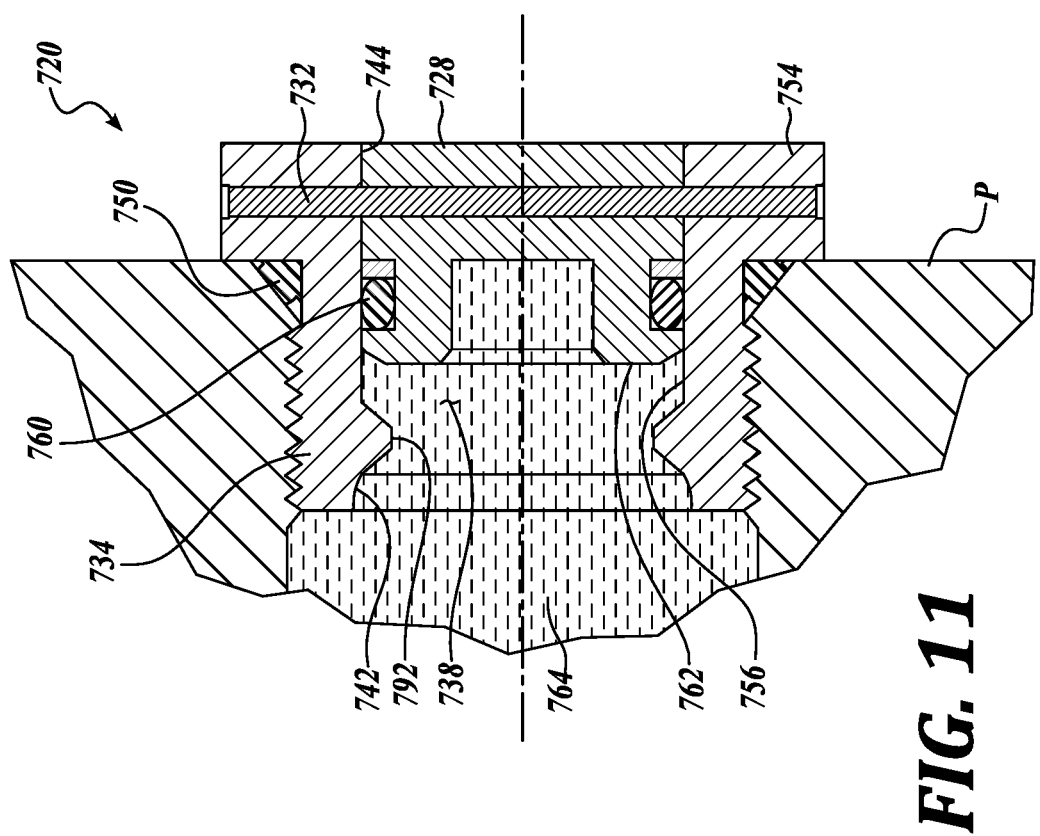
FIG. 11 is a longitudinal cross-sectional view of a fuse pin valve in accordance with another embodiment of the present disclosure.

FIG. 11 illustrates another embodiment of a fuse pin valve, generally designated 720, formed in accordance with aspects of the present disclosure. The fuse pin valve 720 is substantially similar in construction and operation as the fuse pin valve 620 described above with regard to FIG. 10, except for the differences that will be described in more detail below. Components of the fuse pin valve 720 shown in FIG. 11 that are labeled with reference number 7XX correspond to similar components labeled with reference number 6XX in FIG. 10, except as noted.

Similar to the embodiment of FIG. 10, the through bore 638 of the fuse pin valve 720 shown in FIG. 11 has a constant cross-section. As such, the mechanical stop formed by piston interference with the second end opening 644 has been omitted. Similarly, a piston retarder, such as any of the piston retarders illustrated in the embodiments of FIGS. 1, 6, 7, and 8, has been omitted. As shown in FIG. 11, the housing 724 is truncated and terminates with the flange 754. As such, the housing 724 omits the radially disposed discharge outlets shown in the embodiment of FIG. 10. Instead, the second end opening 744 forms one large discharge outlet once the fuse pin 732 shears and the piston 728 is expelled via pressure from the housing 724. A discharge orifice 792 can be incorporated to control the flow of the pressurized fluid in various applications, if desired.

Of course, other embodiments of the valves described herein, including valve 620, may be formed with an enclosed second end section, thereby omitting the second end opening. In these embodiments, the piston is capable of traveling from a closed state of the valve to an open state of the valve, and to be restrained from further movement via the enclosed end.

Figure 13:
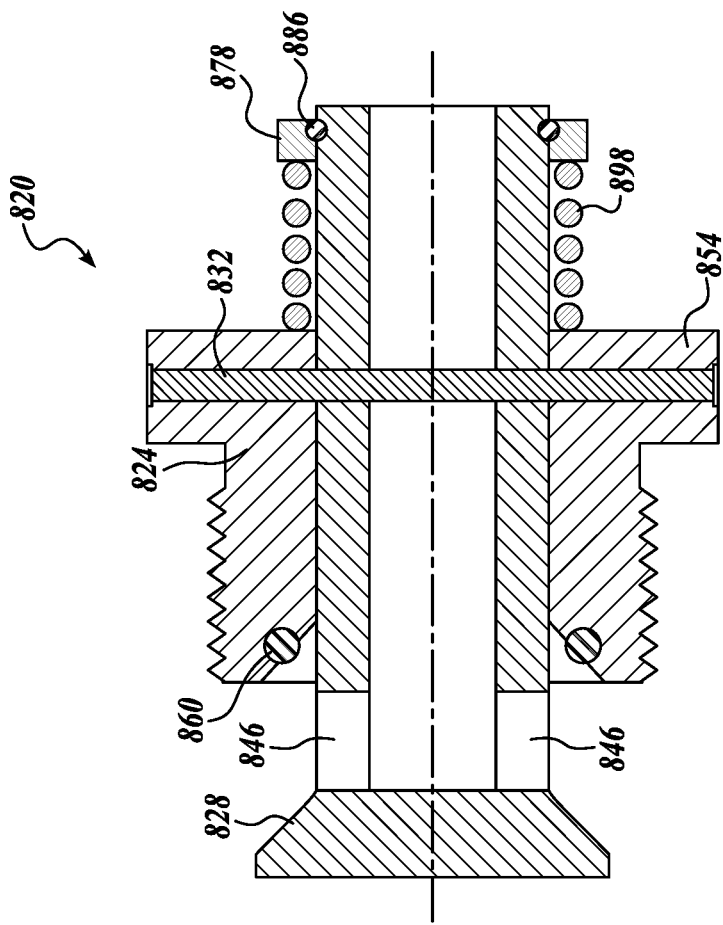
FIG. 13 is a longitudinal cross-sectional view of a fuse pin valve in accordance with another embodiment of the present disclosure.
Figure 12:
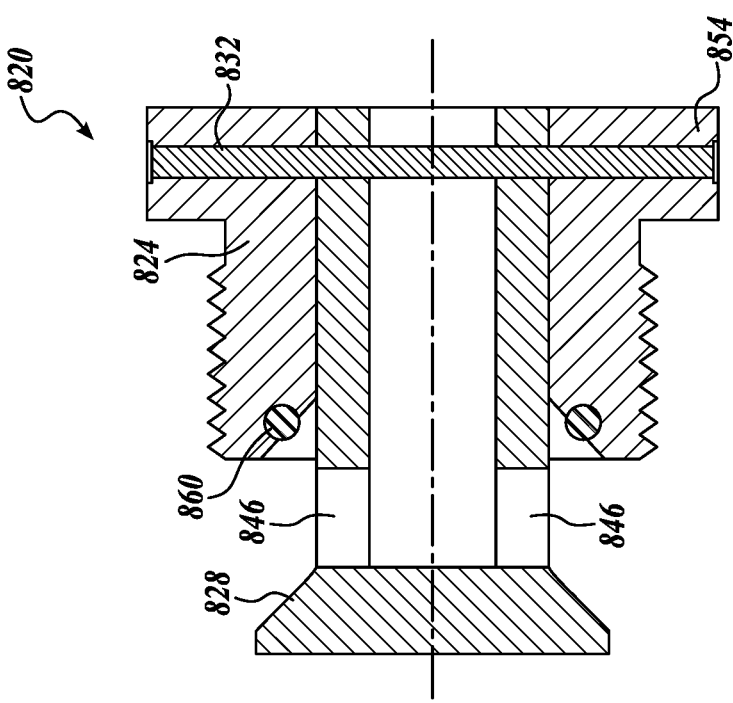
FIG. 12 is a longitudinal cross-sectional view of a fuse pin valve in accordance with another embodiment of the present disclosure.

It will be appreciated that other variations of the fuse pin valves disclosed herein are possible. For example, any of the fuse pin valves described herein can be actuated pneumatically instead of hydraulically. Additionally or alternatively, the fuse pin valve in some embodiments is configured and arranged to actuate from a first piston position, wherein the valve is in an open state, to a second piston position, wherein the valve is in a closed stated. FIGS. 12 and 13 depict examples of a normally open fuse pin valve, generally designed 820, that includes a piston 828 that transitions from a valve open position (shown in FIGS. 12 and 13) to a valve closed position when the fuse pin 832 is sheared. In the valve closed position, the piston 828 has translated with respect to the housing 824 in order to block the discharge outlets 846 in a sealing manner. In the embodiment shown, a seal 860 is employed in order to provide suitable sealing characteristics to the valve 820. The seal 860 may be disposed in a seal groove in order to prevent flow forces from dislodging the seal 860.

In the embodiment of FIG. 13, the piston 828 is biased to the closed position by a spring 898 once the fuse pin 832 shears. In the embodiment shown in FIG. 13, the spring 898 is disposed between the end surface of the flange 854 and a spring stop 878. The spring stop 878 may be coupled to end of the piston 828 via a retainer 886.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A fluid valve, comprising:
   a housing including a bore and a plurality of discharge outlets disposed in fluid communication with the bore, the plurality of discharge outlets adapted to be exposed to a first pressure, wherein the bore defines a first opening adapted to be coupled to a source of pressurized fluid that is greater than the first pressure;
   a piston slidably disposed in the bore thereby defining a first cavity in fluid communication with the first opening and positioned on a first side of the piston and a second cavity positioned on a second side of the piston opposite the first side of the piston,
   wherein the piston is slidable between a valve closed position in which the plurality of discharge outlets are blocked from communication with the first opening, and a valve open position in which at least one discharge outlet of the plurality of discharge outlets is connected in fluid communication with the first opening, and wherein the bore and the piston are configured such that the piston is able to continue to move in a slidable manner a selected distance past the valve open position to an end position in which movement of the piston is stopped; and
   a mechanical fuse configured to retain the piston in the valve closed position, wherein the mechanical fuse is configured to fail once the piston is exposed to a pressurized fluid in the first cavity having a pressure greater than a threshold value, wherein, upon failure of the mechanical fuse, the piston is capable of transitioning from the valve closed position to the end position; and
   means for retarding the movement of the piston between the valve open position and the end position, wherein said means for retarding includes a fluid medium disposed in the second cavity and at least one metering orifice in fluid communication with the second cavity.

2. The fluid valve of claim 1, wherein the pressurized fluid is a hydraulic fluid.

3. The fluid valve of claim 1, wherein:
   the piston travels along an axis of the housing;
   the mechanical fuse includes a fuse pin; and
   the mechanical fuse is disposed through the housing and the piston approximately normal to the axis.

4. The fluid valve of claim 3, further comprising retaining means for retaining the fuse pin in relation to the housing and the piston.

5. The fluid valve of claim 4, wherein the retaining means includes one of a press fit, an adhesive, welding, soldering, a lock wire, a deformed housing, a deformable band, an adjustable clamp, or a C-clip.

6. The fluid valve of claim 1, wherein movement of the piston includes a first, acceleration stage, in which the piston transitions from the valve closed position to a valve fully open position in which the plurality of discharge outlets are completely exposed to the pressurized fluid, and a second, deceleration stage, which occurs after the valve fully open position and before the end position, the deceleration stage resulting from at least said means for retarding the movement of the piston.

7. The fluid valve of claim 1, wherein the piston includes a piston head and a piston rod, wherein the bore defines a second opening configured to receive the piston rod as the piston moves toward the end position, and wherein the means for retarding the movement of the piston further includes a snubbing device, one or more springs, or a stepped section of increased cross-section formed by the piston rod and interfering with the second opening.

8. A shock strut of the aircraft, the shock strut comprising:
a working cavity containing a hydraulic fluid;
a pressure port coupled in fluid communication with the working cavity; and
valve of claim 1 coupled to the pressure port so that the first opening of the fluid valve is disposed in fluid communication with the working cavity.

9. The shock strut of claim 8, wherein the threshold pressure is indicative of one or a hard landing of the aircraft or a crash landing of the aircraft.

10. The fluid valve of claim 1, wherein the plurality of discharge orifices are spaced a distance from the at least one metering orifice of the means for retarding the movement of the piston.

11. The fluid valve of claim 1, wherein the piston includes a piston head and a piston rod, wherein the bore defines a second opening configured to receive the piston rod as the piston moves toward the end position, and wherein the at least one metering orifice includes a plurality of metering orifices formed by the housing.

12. A fluid valve, comprising:
a housing including a bore and a plurality of discharge outlets disposed in fluid communication with the bore and adapted to be exposed to a first pressure, wherein the bore defines a first opening adapted to be coupled to a source of pressurized fluid that is greater than the first pressure and a second opening positioned a spaced distance from the first opening;
a piston having a piston head and a piston rod, the piston slidably disposed in the bore and located between the first opening and the second opening, the piston slidable in the bore between a first valve state in which the plurality of discharge outlets are prohibited from communication with the first opening, and a second valve state in which the plurality of discharge outlets are connected in fluid communication with the first opening, wherein the bore and the piston are configured such that the piston is able to continue to move in a slidable manner a selected distance past the second valve state to an end position;
a mechanical fuse configured to retain the piston in the first valve state, wherein the mechanical fuse is configured to fail once the piston is exposed to a pressurized fluid having a pressure greater than a threshold value, wherein, upon failure of the mechanical fuse, the piston capable of transitioning to the end position, and
means for retarding the movement of the piston between the second valve state and the end position, wherein said means for retarding includes one or more of:
at least one spring disposed around the piston rod;
a stepped section of increased cross-section formed by the piston rod and capable of: (1) interfering with the second opening; or (2) blocking one or more fluid discharge holes formed by the housing and spaced a distance from the plurality of discharge outlets and toward the second opening.

13. The fluid valve of claim 12, further comprising a covering that covers the plurality of discharge outlets and aids in the retention of the mechanical fuse.

14. The fluid valve of claim 12, wherein the piston slidably disposed in the bore defines: (i) a first cavity in fluid communication with the first opening and positioned on a first side of the piston; and (ii) a second cavity in fluid communication with the second cavity and with the one or more fluid discharge holes, the second cavity positioned on a second side of the piston that is opposite the first side of the piston, wherein the fluid valve further comprises a grease medium disposed in the second cavity.

15. The fluid valve of claim 12, wherein the second opening is coaxially disposed with respect to the first opening, and wherein the second opening is adapted to be exposed to the first pressure.

16. The fluid valve of claim 15, wherein the piston head has a cross-sectional area that is less than a cross-sectional area of the second opening.

17. The fluid valve of claim 1, wherein the piston includes a piston head and a piston rod, wherein the bore defines a second opening configured to receive the piston rod as the piston moves toward the end position, and wherein the at least one metering orifice is the second opening.

18. The fluid valve of claim 11, wherein the plurality of metering orifices includes the second opening.

* * * * *